Nov. 17, 1970     J. H. CONNOR     3,540,959
METHOD OF MANUFACTURING A LAMINATED TUBULAR ARTICLE
HAVING A MATTE FINISH SURFACE
Original Filed Feb. 24, 1964
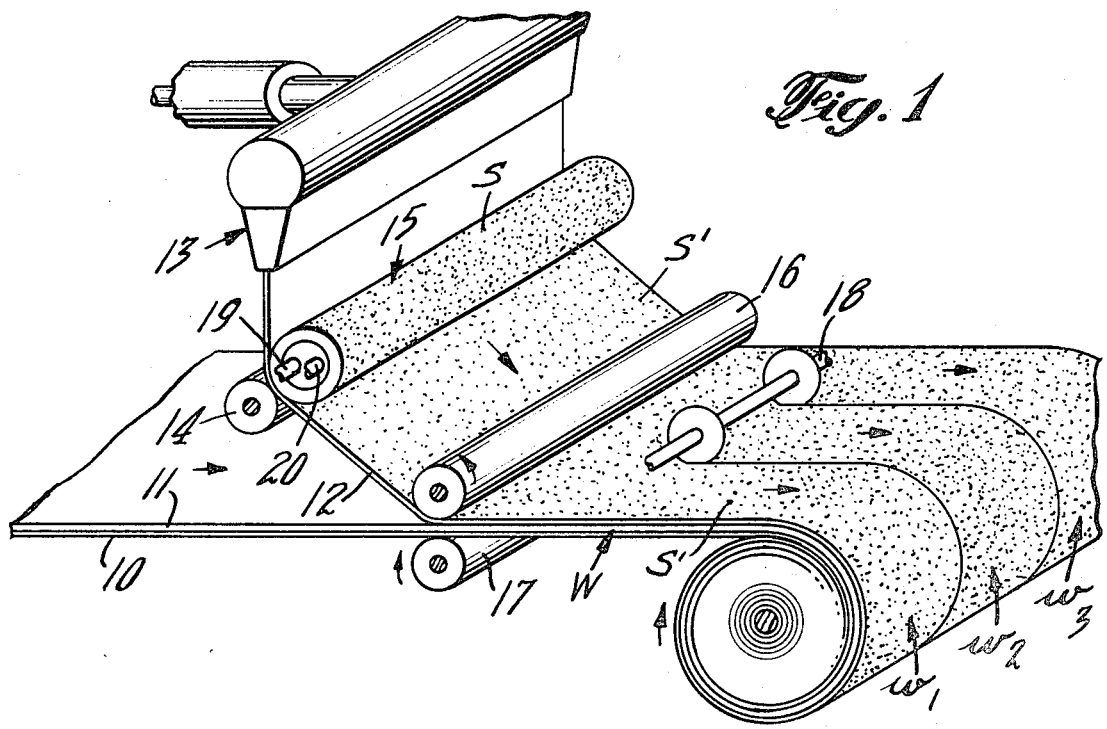
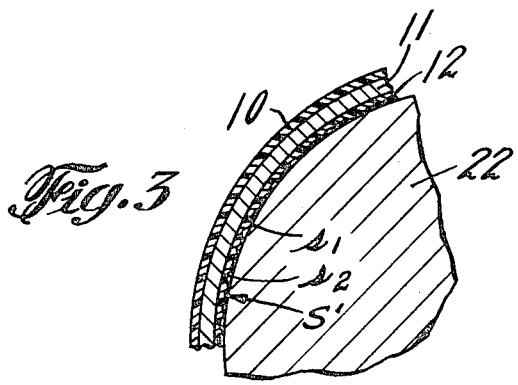
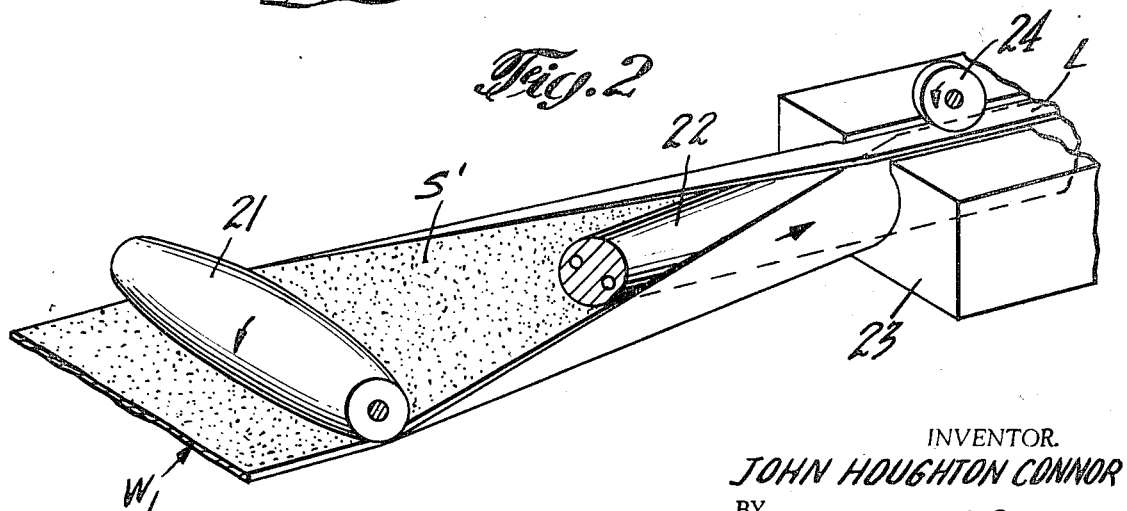
INVENTOR.
JOHN HOUGHTON CONNOR
BY Louis F. Heeb
ATTORNEY United States Patent Office 3,540,959
Patented Nov. 17, 1970

3,540,959
METHOD OF MANUFACTURING A LAMINATED TUBULAR ARTICLE HAVING A MATTE FINISH SURFACE
John Houghton Connor, Chester, N.J., assignor to American Can Company, New York, N.Y., a corporation of New Jersey
Continuation of application Ser. No. 346,686, Feb. 24, 1964. This application Mar. 14, 1969, Ser. No. 808,377
Int. Cl. B29d 23/10
U.S. Cl. 156—203         2 Claims

ABSTRACT OF THE DISCLOSURE

A method of preparing the surface of a sheet of thermoplastic material to reduce its area of contact and consequent frictional resistance with the surface of a forming tool over which the sheet is shaped in the manufacture of containers. The inner surface of the thermoplastic sheet, which is the surface which makes direct contact with the forming tool during the container manufacturing operation, is given a coarse or matte finish, characterized by closely spaced minute irregularities on the order of about 5.0 to 25.0 micro inches in height and depth, measured on the basis of an arithmetic average. Preferably, the finish is impressed on the thermoplastic material during its formation in an extrusion operation and while it is still thermally soft by passing it over a chill roll having a matte finish surface of the desired coarseness.

---

This application is a continuation of an earlier filed application, Ser. No. 346,686, filed Feb. 24, 1964, now abandoned.

This invention relates to the manufacture of tubing, and is particularly directed to improvements in the art of making continuous tubing from laminated web stock by the process of progressively shaping the web about an elongate forming member as the web is fed longitudinally onto the member.

Various techniques are known for fabricating tubing from flat stock. One type of continuous operation is to shape an endless web of selected material into tubular configuration by passing the web over an elongate forming horn or mandrel while progressively folding the web about the mandrel and seaming its longitudinal edges together. This technique has been used in the manufacture of tubing of many types of materials, including metals, papers, plastics and various laminations of these materials, and has found particular utility in the fabrication of tubular container bodies of laminated stock. This enables the accomplishment of certain preliminary operations, such as labeling, coating, the application of barrier films, etc., while the stock is still in the flat and has the advantages of easier and more economical operation.

One drawback of forming tubing in this manner, however, is in the fact that, in folding and shaping the web over the mandrel, there is considerable frictional engagement between the mandrel and the inner surface of the web. This is accentuated by drawing the web into relatively tight encirclement of the mandrel to ensure accurate sizing of the tubing as it is formed, and is particularly severe where the inner surface of the web, or that surface which actually engages the mandrel, has a high coefficient of friction or other surface characteristics which promote sticking. The gloss surface finish of polyethylene film, for example, has been found to be especially susceptible to seizure or sticking to the mandrel surface. In such instances, it is necessary to increase the feed tension on the web as it is formed to overcome this frictional resistance and it will be appreciated that there is a limit to the amount of tension that can be applied before either slippage between the web and its feed mechanism or severe damage and breakage of the web occurs.

The primary object of my invention, therefore, is to overcome these problems in forming continuous tubing from flat web stock by reducing the frictional resistance of the forming tool to the moving web.

Another object of this invention is the provision of an improvement in the art of forming continuous tubing wherein the frictional contact between the web as it is formed and the forming tool is substantially reduced.

Still another object of this invention is to provide an improved method of forming continuous tubing by conditioning the inner surface of the tubing preparatory to shaping it on an elongate forming tool to reduce its frictional contact with the tool during the shaping operation.

The manner in which these objects are achieved will be made clear from the following description which, taken in connection with the accompanying drawing and appended claims, disloses a preferred embodiment of my invention.

Referring to the drawing:

FIG. 1 is a perspective view of an illustrative form of apparatus for the practice of my novel method;

FIG. 2 is a perspective view of a shaping operation showing the step of forming continuous tubing from an endless web after it has been conditioned according to my invention; and FIG. 3 is an enlarged fragmentary sectional view taken substantially along lines 3—3 of FIG. 2.

As illustrative of the type of operation where my invention may be practiced, I have illustrated in FIG. 1 a typical apparatus for fabricating laminated web stock. For purposes of illustration and not limitation, the web W is a three ply structure comprising a first ply 10 of thermoplastic material, an intermediate barrier ply 11 of impervious material, such as metallic foil, and a second thermoplastic ply 12. The thermoplastic plies 10 and 12 may be of like or dissimilar material, depending on the specific characteristics desired, examples of which are polyethylene, polyvinyl chloride, polyvinylidene chloride, polypropylene, etc. The final web may contain additional plies or layers, examples of which are special papers, adhesive resins, etc., and in the case where the web is used in the manufacture of packing containers it normally is printed in the flat with advertising and decorative indicia. The indicia may be applied to the outer surface of ply 10 or between the barrier ply 11 and the ply 10 if the latter is a translucent thermoplastic. These variations in the structural makeup of web W play no part in my instant invention but are illustrative of the different forms which the laminated web may take to satisfy different specific uses.

The instant invention resides in the manner of preparing or conditioning the final thermoplastic ply 12 which makes up web W so that its frictional engagement with the forming tool on which the web is to be shaped into tubular configuration is substantially reduced. As illustrated in FIG. 1, the final ply may be applied to previously bonded plies 10 and 11 in the form of an extruded film which emerges in a heated state from an elongate nozzle of an extruder unit 13. The heated film first passes between the nip of a pair of rollers 14 and 15 and then is fed along with plies 10 and 11 between the nip of another pair of rollers 16 and 17, the latter serving to press and bond the ply 12 to the upper surface of ply 11 to complete the forming of web W. The web is then cut into individual narrow webs of desired width by a cutting device 18 and finally wound into individual coils or rolls, illustrated as $w_1$, $w_2$, $w_3$, which rolls are later used in forming continuous tubing as hereinafter described. If desired, roller 15 may be chilled to facilitate the cooling and partial setting of thermoplastic ply 12. The desired roller temperature may be maintained by any suitable means, an example being by circulating a refrigerant within the roller through inlet and outlet conduits 19, 20 which may be appropriately connected to the interior of the roller through its mounting shaft.

The surface S of roller 15 has special and unique characteristics which enable the conditioning or preparation of the surface S' of the ply 12 to render this surface, as the inner surface of the tubing to be formed, less frictionally resistant to the forming tool over which the web is shaped in the forming operation. The roller surface S may be described as having a matte finish characterized by closely spaced minute irregularities in the form of random projections and depressions.

An example of such a surface is that produced on a roller having an initially smooth, thin chromium layer plated to the outer surface of the base metal of the roller, which chromium layer has been subjected to blasting with a fine grit, such as alumina, silicon carbide or the like, which ranges in size from about 50 to 150 mesh. The blasting of the roller surface may be carried out in any one of several ways, specific examples of which are given in U.S. Pat. No. 3,063,763 to W. J. Zubrisky. As explained in said patent, the variations inherent in grit blasting renders it impossible to give exact dimensions to the random projections and depressions produced thereby, but that measurements with a profilometer enable the determination of a range of the depth of the irregularities on the basis of an arithmetic average. For the purposes of the instant invention, the terms matte finish and minute surface irregularities as used herein are intended to refer to a surface condition characterized by randomly spaced minute depressions and projections having an average depth of from about 5.0 to about 25.0 microinches on an arithmetic average and which are generally of the size and shape produced by blasting a smooth, hard surfaced roller with grits of from about 50 to 150 mesh.

While the example referred to above is concerned with a chromium plated roller grit blasted in the designated manner, it is to be understood that I contemplate in the practice of my invention the use of rollers having surfaces hardened by means other than chromium plating, examples being case hardening or plating with other metals known to have high hardness characteristics.

As the thermoplastic ply 12 passes between the nip of rollers 14 and 15, the special surface S on rollers 15 prints or impresses on the upper surface S' of the thermoplastic ply a corresponding pattern having substantially identical surface irregularities in the form of randomly spaced minute projections $s_1$ and depressions $s_2$ (see FIG. 3). In passing over roller 15, the web is chilled to a semi-solid or somewhat tacky state, a condition most suitable for receiving a full and permanent impression. The arithmetic average depth of the depressions $s_2$, or height of the projections $s_1$, is substantially equal to those on the roller surface S, ranging from about 5.0 to about 25.0 microinches. The projections $s_1$ are of tooth-like configuration having sharp or pointed extremities and present a somewhat uniform or even contact surface of substantially reduced contact area by reason of the small pointed extremities being separated by the intervening depressions $s_2$.

The importance of this reduced contact area on the surface of ply 12, corresponding to the interior surface of the tubing to be formed from a strip of web W, is best appreciated by reference to FIG. 2 which illustrates a typical apparatus for forming tubing continuously from flat stock. The web strip, illustrated as $w_1$, and being one of the smaller webs cut from laminated web W, is fed over a guide roller 21 and longitudinally onto an elongate horn or mandrel 22 which is enclosed in a shaping block 23. A suitable feed mechanism (not shown) engages the exterior surface of the web strip to move it continuously onto the mandrel and through the shaping block.

During its travel, the strip $w_1$ is progressively folded around the mandrel in tight encirclement and its opposite longitudinal edges are overlapped and joined together as a lap seam L by a heated pressure roller 24 or equivalent seaming member. To ensure accurate sizing of the tubing as it is formed and to provide sufficient reactant surface beneath the lapped edges to accomplish the seaming operation, it is necessary that the tubing tightly encircle the mandrel 22 for a substantial distance. However, the frictional contact between the tubing and this length of the mandrel, which tends to resist the movement of the tube and cause possible slippage and/or seizing, is reduced to a minimum by reason of the presence of projections $s_1$ and depressions $s_2$ on the inner surface of the tubing, as seen in FIG. 3. The only frictional contact between the tubing and mandrel is that represented by the total of the small pointed extremities of tooth-like projections $s_1$, this being only a fraction of the total surface area which could make frictional contact with the mandrel if not conditioned in the above described manner.

Where the tubing is to be used in discrete lengths, as for example, in the manufacture of container bodies, it may be cut into desired lengths by conventional automatic cutting equipment as it leaves the mandrel.

It is thought that the invention and many of its attendant advantages will be understood from the foregoing description and it will be apparent that various changes may be made in the steps of the method described and their order of accomplishment without departing from the spirit and scope of the invention or sacrificing all of its material adavntages, the method hereinbefore described being merely a preferred embodiment thereof.

I claim:

1. A method of making tubular articles of laminated materials comprising the steps of:

forming a base layer of at least one selected material;

separately extruding a thermoplastic material to form a heated thermoplastic second layer;

passing the heated, thermoplastic second layer between the nip of two rollers, one of which rollers is a chilled roller having a surface hardened, matte finish thereon characterized by closely spaced, minute depressions of an arithmetic average depth of about 5.0 to 25.0 microinches, to produce on a surface of the thermoplastic second layer a multitude of closely spaced, minute projections, placing the other surface of the thermoplastic second layer in contact with the base layer, applying pressure to said layers to form a laminated web, and shaping the web over an elongate forming tool by moving the web longitudinally of and progressively folding it about the forming tool with the thermoplastic second layer in intimate sliding contact therewith to thereby form the web into a tubular configuration with a minimum of frictional resistance between the web and the forming tool.

2. A method of making tubular articles of laminated materials comprising the steps of:

forming a base layer of at least one selected material;

separately extruding a thermoplastic material to form a heated thermoplastic second layer;

placing a surface of the thermoplastic second layer in contact with a surface of the base layer;

applying pressure to said layers to form a laminated web;

passing said laminated web between the nip of two rollers, one of which rollers is a chilled roller having a surface hardened, matte finish thereon characterized by closely spaced, minute depressions of an arithmetic average depth of about 5.0 to 25.0 microinches, to produce on a surface of the thermoplastic second layer a multitude of closely spaced, minute projections; and shaping the web over an elongate forming tool by moving the web longitudinally of and progressively folding it about the forming tool with the thermoplastic second layer in intimate sliding contact therewith to thereby form the web into a tubular configuration with a minimum of frictional resistance between the web and the forming tool.

References Cited

UNITED STATES PATENTS

| | | | |
|---|---|---|---|
| 2,799,896 | 7/1957 | Grow et al. | 18—47 |
| 2,941,570 | 6/1960 | Plym | 156—203 |
| 2,578,664 | 12/1951 | Beery et al. | 156—200 X |
| 3,195,427 | 7/1965 | Adams | 156—218 X |
| 3,195,428 | 7/1965 | Tuma | 156—200 X |
| 3,411,542 | 11/1968 | Walsh et al. | 156—218 X |

FOREIGN PATENTS 1,283,953  1/1962  France.

CARL D. QUARFORTH, Primary Examiner

S. J. LECHERT JR., Assistant Examiner

U.S. Cl. X.R.

156—209, 218, 219, 220, 222, 244, 306; 161—164, 178, 180; 264—284, 293